Figure 1:
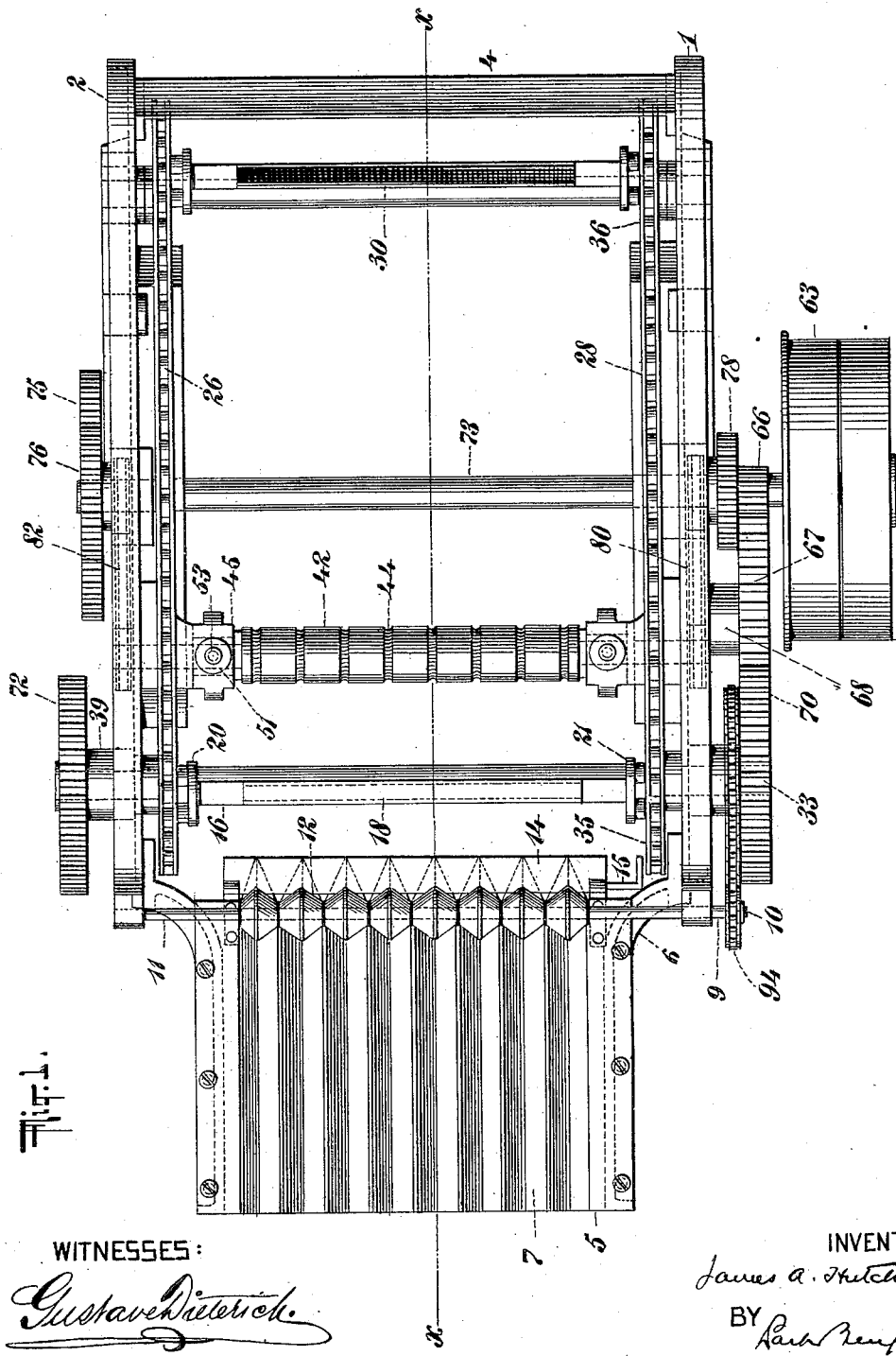

No. 713,886. Patented Nov. 18, 1902.
J. A. HUTCHESON.
TOBACCO STRIPPING MACHINE.
(Application filed July 11, 1902.)
(No Model.) 5 Sheets—Sheet 1.

WITNESSES:
Gustave Dieterich.
Edwin H. Dieterich.

INVENTOR
James A. Hutcheson
BY
ATTORNEY.

No. 713,886. Patented Nov. 18, 1902.
J. A. HUTCHESON.
TOBACCO STRIPPING MACHINE.
(Application filed July 11, 1902.)
(No Model.) 5 Sheets—Sheet 2.
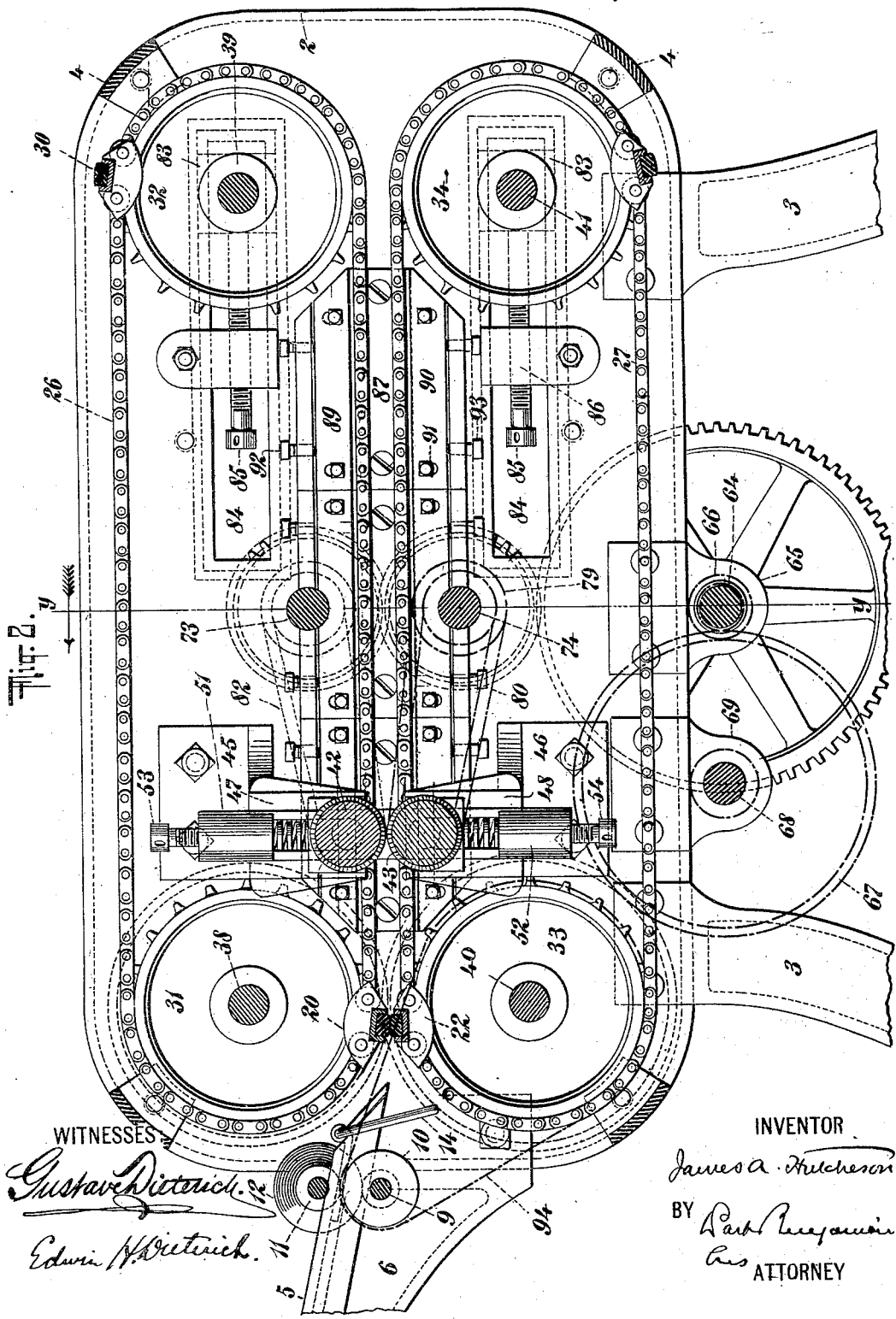

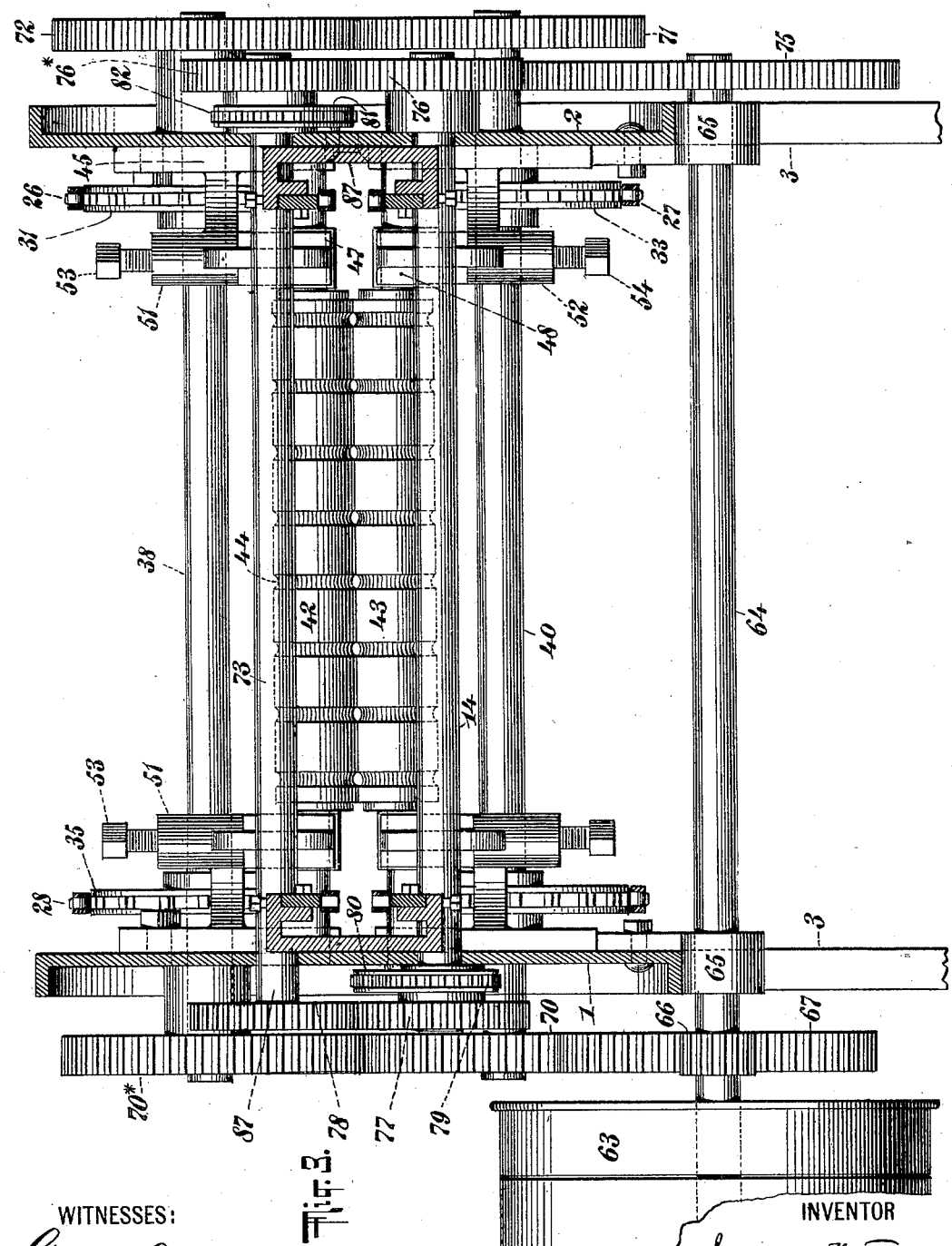

No. 713,886. Patented Nov. 18, 1902.
J. A. HUTCHESON.
TOBACCO STRIPPING MACHINE.
(Application filed July 11, 1902.)
(No Model.) 5 Sheets—Sheet 4.
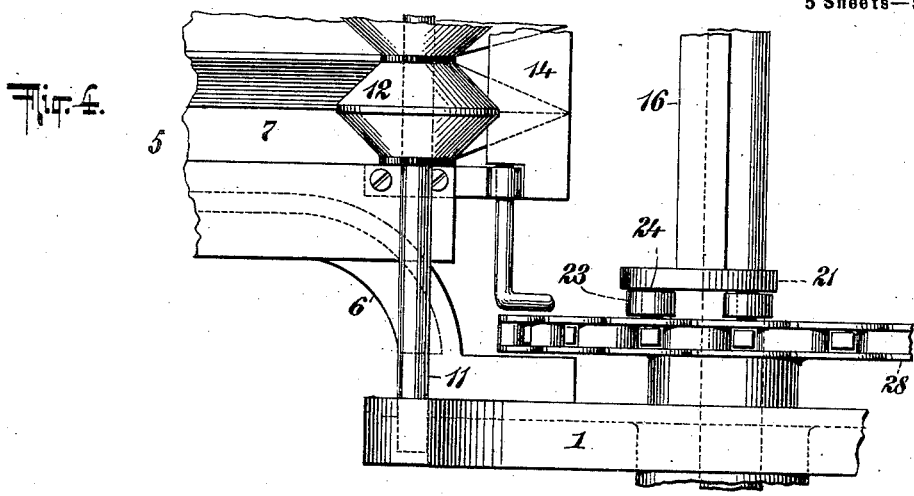
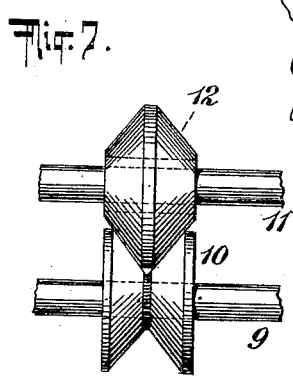
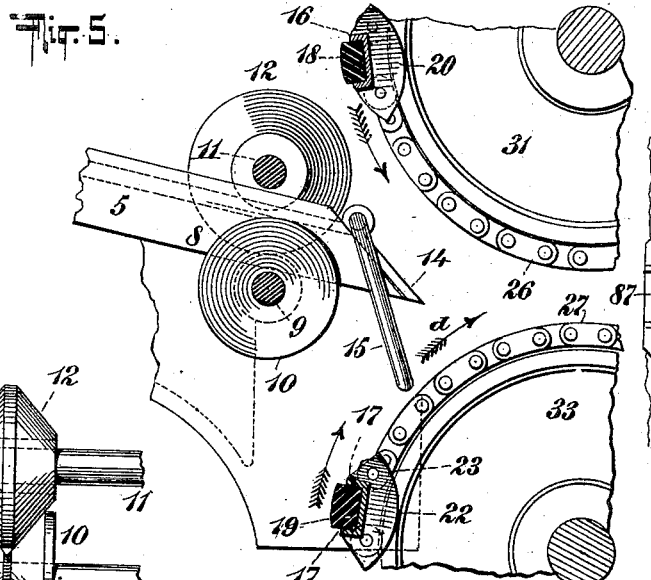
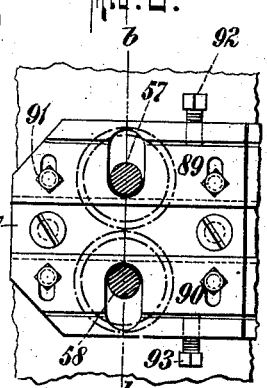
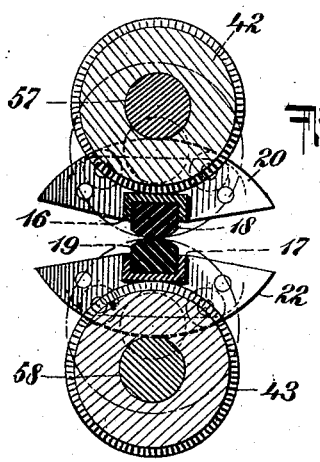
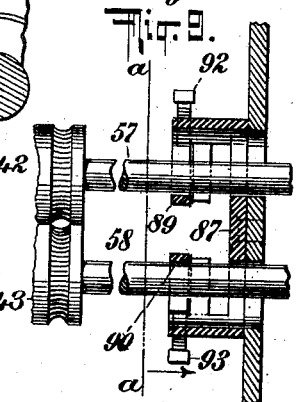
WITNESSES:
Gustave Dieterich
Edwin H. Dieterich
INVENTOR
James A. Hutcheson
BY Lark Benjamin
his ATTORNEY No. 713,886. Patented Nov. 18, 1902.
J. A. HUTCHESON.
TOBACCO STRIPPING MACHINE.
(Application filed July 11, 1902.)
(No Model.) 5 Sheets—Sheet 5.
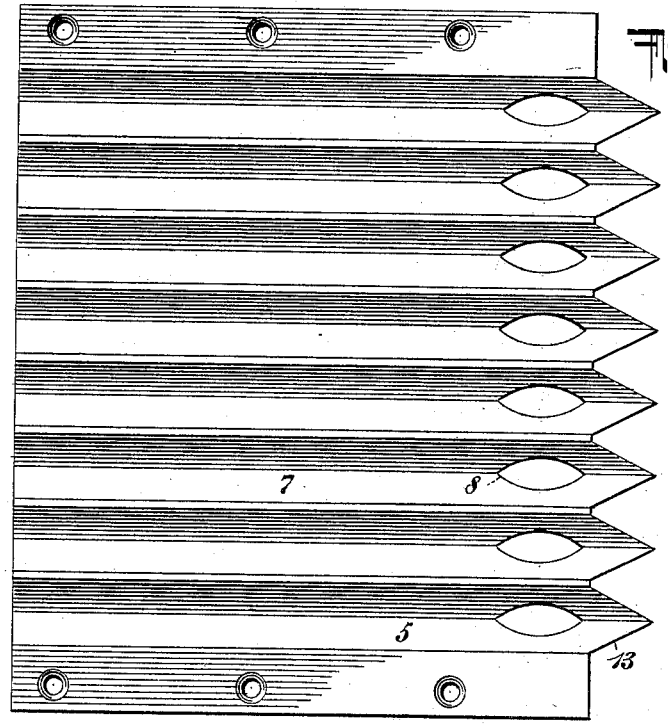
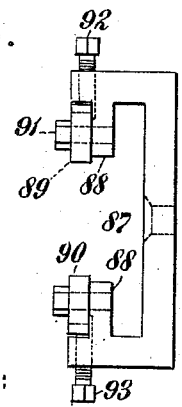
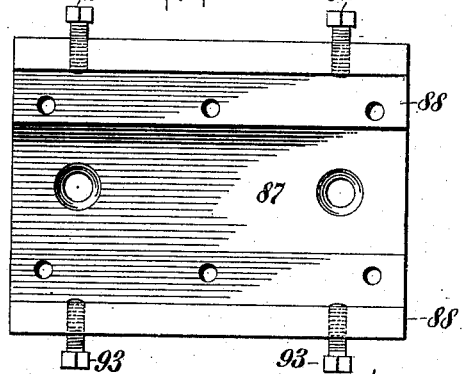
WITNESSES:
Gustave Dieterich
Edwin H Dieterich
INVENTOR
James A. Hutcheson
BY Paul Benjamin
his
ATTORNEY

UNITED STATES PATENT OFFICE.

JAMES A. HUTCHESON, OF RICHMOND, VIRGINIA, ASSIGNOR TO UNITED STATES TOBACCO STEMMING COMPANY, A CORPORATION OF NEW JERSEY.

TOBACCO-STRIPPING MACHINE.

SPECIFICATION forming part of Letters Patent No. 713,886, dated November 18, 1902.

Application filed July 11, 1902. Serial No. 115,162. (No model.)

*To all whom it may concern:*

Be it known that I, JAMES A. HUTCHESON, a citizen of the United States, residing at Richmond, Henrico county, Virginia, have invented a new and useful Improvement in Tobacco-Stripping Machines, of which the following is a specification.

The invention relates to a machine for stripping the leaf portion of a tobacco-leaf from the stem.

The invention consists in the combination, broadly, in such a machine, of a leaf-stripping device, a leaf-clamping device, and means for moving said clamping device away from said stripping device during the operation of said stripping device upon the leaf; also, in means for moving said clamping device toward and then from said stripping device; also, in means for moving said clamping device while retaining the leaf between the stripping-rolls; also, in means for simultaneously cutting the leaf from the stem during its movement of translation while clamped as aforesaid; also, in the construction whereby the leaves may be guided in parallel columns to the stripping devices; also, in the construction whereby the movement of said leaves to said stripping device is intermittently arrested; also, in the various adjustments described, and also in the various combinations and instrumentalities more particularly set forth in the claims.

In the accompanying drawings, Figure 1 is a plan view. Fig. 2 is a vertical section on the line $x\,x$ of Fig. 1. Fig. 3 is a vertical section on the line $y\,y$ of Fig. 2. Fig. 4 is an enlarged detail view of the device for intermittently opening the feed-gate. Fig. 5 is a side elevation of the same, showing also the clamping device on the sprocket-chains. Fig. 6 is an enlarged cross-section showing stripping-rolls, clamping device, and cams for separating said rolls. Fig. 7 is an elevation of a pair of the feed-rolls. Fig. 8 is a detailed view of a portion of the inner side of the side plates, showing the openings for permitting play of the stripping-roll shafts and the manner in which said shafts pass through the guide-plates for the sprocket-chains, said figure being a section on the line $a\,a$ of Fig. 9. Fig. 9 is a section on the line $b\,b$ of Fig. 8. Fig. 10 is a plan view of the feed-table. Fig. 11 is an elevation of the front end thereof, and Fig. 12 a side elevation. Fig. 13 is an end view of one of the guide-channels for the sprocket-chains which carry the clamping devices. Fig. 14 is a front view of the same. Fig. 15 represents one of the chain-adjusting presser-bars separately.

Similar numbers of reference indicate like parts.

The frame of the machine consists of the side plates 1 2, supported on standards 3 and connected by transverse bars 4.

*The feed-table and leaf-controlling device.*— The function of the controlling device is to arrest intermittently the movement of the leaves to the clamping and drawing-in device. Figs. 10, 11, and 12 show the feed-table 5, which is supported on the side plates by brackets 6. Said table may be formed, as shown, with a plurality of channels 7, of preferably V-shaped cross-section, and in said channels, near the delivery end, are openings 8. Extending transversely beneath the feed-table is a shaft 9, Fig. 5, carrying rolls 10, each roll having a V-shaped circumferential groove substantially conforming to the shape of the V-shaped channels in the feed-table 7. The several rolls 10 come below the openings 8, respectively. Above the feed-table is a shaft 11, carrying a plurality of double-beveled rolls 12, which correspond to the lower rolls 10 and meet said lower rolls through the openings 8 in the feed-table, as shown in Fig. 5. The inner end of the feed-table is beveled, as shown at 13, Fig. 12, and is provided with a hinged gate 14, having an arm 15, by raising which, as indicated by the arrow $d$, Fig. 5, the gate is opened.

The operation of the above-described parts is as follows: The leaves to be stripped being placed butt-end foremost in the channels 7 of the feed-table are moved onward by hand until they come between the rolls 10 and 12. The lower roll-shaft 10 is driven by a sprocket-chain 94, which passes over sprocket-wheels respectively on said roll-shaft and the shaft 33. The upper feed-rolls are rotated by contact with the lower rolls and serve as presser-rolls upon the leaves. If the gate 14 is closed, the onward movement of said leaves will thereby be impeded; but if by means hereinafter to be explained the gate is intermittently opened the leaves will then pass onward in as many separate columns as there are channels 7 in the feed-table. The feed-rolls 10 and 12 may be omitted, in which case the leaves will continue to be fed onward by hand until they reach the gate, which intermittently opens to permit their passage in the manner already described.

*The clamping and drawing-in device.*— The function of this device is, first, to clamp and so hold the incoming leaves, and, second, while so holding them to carry them between the stripping-rolls, which are separated for that purpose. After the stripping-rolls begin to act upon the leaves the clamping device, still continuing its onward movement, carries forward the stem at a speed conforming to the rate at which the stripping-rolls cut or abrade the leaf portion away from it. The stripped stem is finally released by the separation of the parts which hold it. The clamping device consists of two metal bars 16 17, Figs. 5 and 6, channeled over the middle portion of their length and in said channels receiving bars 18 19, of rubber or other elastic material. Bar 16 is carried at its ends by cam-plates 20 21 and bar 17 at its ends by similar cam-plates 22. On the rear side of each cam-plate are pins 24, which carry rollers 23. To the pins 24 are connected the ends of the sprocket-chains 26 27 28 29, hereinafter described. There may be, as here shown, a plurality of pairs of drawing-in bars, with camplates similarly arranged and connected to the sprocket-chains. A second pair, distant half the length of the sprocket-chain from the first pair, is shown at 30, Fig. 2. There are four sprocket-chains 26 27 28 29, carrying the clamping-bars, two of said chains being on each side of the machine. Thus on one side the upper sprocket-chain 26, Fig. 2, passes over the sprocket-wheels 31 32 and the lower sprocket-chain 27 passes over the sprocket-wheels 33 34. On the other side the upper sprocket-chain 28, Fig. 1, passes over the sprocket-wheels 35 36 and the lower sprocket-chain 29 over the sprocket-wheel 37 and a rear wheel, (not shown, but parallel to sprocket-wheel 34.) The several sprocket-wheels are carried on shafts journaled in the side plates 1 2, as follows: front upper sprocket-wheels 31 35 on shaft 38, rear upper sprocket-wheels 32 36 on shaft 39, front lower sprocket-wheels 33 37 on shaft 40, and rear lower sprocket-wheel 34 and its parallel wheel (not shown) on shaft 41. If now it be assumed that motion is imparted to the upper and lower sprocket-chains, so that their adjacent parallel portions will move in the same direction from front to rear of the machine, then it will be evident that the pair of clamping-bars 16 17, as indicated by the arrows in Fig. 5, will come together just in rear of the feed-gate 14. As this takes place a roller 23, Fig. 4, on a lower cam-plate strikes the gate-arm 15, raises it, and so lifts the gate for a short distance, so that the tobacco-leaves may now be delivered by the action of the feed-rolls or by the hand of the operator, if the feed-rolls be omitted, to the pair of clamping-bars until said roller runs under the arm 15 and permits the gate to close by gravity. It is here to be noted that with the table constructed as described the leaves, whether fed by the feed-rolls or by hand, are delivered to the clamping-bars in parallel columns and intermittently—that is to say, the leaves in each channel of the feed-table advance as a separate column, the channel thus serving as a guide for the leaves in it, and the movement of this column is permitted or checked as the gate is intermittently opened and closed. The several columns of leaves are all simultaneously grasped between the clamping-bars, which now begin to travel in a rectilinear path from front to rear of the machine. While I here show a table having a series of guide-channels for the leaves, it is to be understood that I do not intend to limit myself to the use of such a table in the present machine; but I may employ one without the channels, in which case, of course, the leaves will not be guided in parallel columns, as described.

*The stripping device.*—There are two parallel cylindrical stripping-rolls 42 43, each provided with a plurality of circumferential grooves 44, Figs. 1 and 3, and with transverse cutting edges in each groove. This construction of roll I do not herein claim, since it is fully set out in Letters Patent No. 694,962, dated March 11, 1902, to Joseph G. Havens. The said grooves are each so located as to be in line with the channels 7 of the feed-table, so that each column of leaves will be carried from its particular guide-channel to the particular pair of grooves (upper and lower) in line therewith. It will therefore be observed that each guide-channel, conjointly with the grooves on the stripping-rolls in line with it and with the transporting clamping-bars grasping the column of leaves delivered from that channel and carrying said leaves to said pair of grooves in line, constitutes, substantially, a stripping apparatus for that column of leaves and that when there is a plurality of such columns the whole machine becomes substantially a series of parallel stripping-machines, which may be in any desired number, or, in other words, the whole machine may be augmented in transverse width to permit of any desired number of parallel advancing columns of leaves being simultaneously stripped. The stripping-rolls 42 43 are supported in the following manner, the construction being the same at each end of the rolls: Secured on the inner face of the side plate 2 are upper and lower brackets 45 46, which carry forked slides 47 48. In said slides are placed the end bearings 49 50 of the stripping-roll shafts. Above and below the slides, respectively, are the projections 51 52, which receive the set-screws 53 54, which screws abut against the helical springs 55 56, interposed between the sliding bearings 49 50, and serve to adjust the tension of said springs. From the foregoing it will be seen that the stripping-roll shafts are therefore in yielding bearings, the bearing 49 being free to move upward and the bearing 50 to move downward against the resistance of the springs. From Figs. 8 and 9 (in the latter figure the bearings are broken away) it will also be seen that the stripping-roll shafts 57 58 extend through vertically-elongated slotted openings (shown surrounding said shafts in Fig. 8) in the chain presser-bars, to be hereinafter described, and through similar slots 61 62 in the side plate 2, these openings permitting the separation of the shafts and stripping-rolls, as already described. The object of this separation will be readily understood from Fig. 6. As the clamping-bars 16 17 are carried rearward the pair of cam-plates on each end thereof is drawn between the roll-shafts 57 58, so that the curved upper sides of said plates, acting against said shafts, force said shafts asunder from the position indicated in dotted lines, Fig. 6, to that shown in full lines, thus separating the stripping-rolls and allowing the butt-ends of the leaves held between the clamping-bars to be carried between them. As the cam-plates move onward the rolls are forced together again by the action of their springs. Each column of leaves now lies in its own pair of grooves and between the rolls, and the stripping action of the latter at once begins. The stripping-rolls are rotated, so that the teeth therein move while acting on the leaves in a direction opposite to that of the movement of the clamping-bars which grasp the butts. The relative speed of movement of bars and rolls is to be such as that the stem will be carried onward at a rate corresponding to that of the cutting away of its leaf portion by the action of the cutting-teeth. In other words, there should be the minimum of draft, or substantially no draft, on the stem, tending by tension to break it or tending forcibly to drag stem and leaf through the opening formed by the meeting of the pair of grooves, and so to tear leaf and stem apart. Such action usually results in breakage of the stem, especially if fine and tender leaves are used, and this it is my aim especially to avoid. That avoidance is accomplished by the means arranged and operating as above described. After the stem has been stripped the clamping-bars still holding it carry it to the rear of the machine, and then as their supporting sprocket-chains pass over the wheels the clamping-bars are separated and the stem released to fall to the floor or to any suitable receptacle placed to receive it. The stripped-leaf portion is thrown by the action of the stripping-rolls toward the front of the machine and likewise falls to the floor or to any suitable receptacle.

I will now describe the gearing and certain adjusting devices.

*The gearing.*—The driving-pulley 63 is fast on a shaft 64, supported in hangers 65 under the side plates 1 and 2. Motion is transmitted to the front sprocket-wheel shafts 39 40 in the following manner: from gear 66 on driving-shaft 64 to gear 67 on short shaft 68 in hanger 69 to gear 70 on the lower sprocket-wheel shaft 40, which gear engages with a gear 70 on the upper shaft 39. Another gear 71 on the end of shaft 40 on the other side of the machine also engages with gear 72 on the upper sprocket-wheel shaft 39. The rear sprocket-wheel shafts are free to be rotated by the sprocket-chains.

Motion is imparted to the stripping-rolls in the following manner: Directly above the driving-shaft 64 are two shafts 73 74, journaled in the side plates 1 and 2. On the end of the driving-shaft opposite to that which carries the driving-pulley is fixed a gear 75, which engages with gear 76 on the lower shaft 74, which gear 76 engages with a gear 76 on the upper shaft 73. On the other end of shaft 74 is a gear 77, which engages with a gear 78 on shaft 73. Shaft 74, Fig. 3, on the driving-pulley side carries a sprocket-wheel 79, the chain 80 of which passes over a wheel on the lower roll-shaft, and so drives that shaft. Shaft 73 carries a sprocket-wheel 81, the chain 82 of which passes over a wheel on the upper roll-shaft, and so drives that shaft. Both stripping-rolls are therefore positively rotated and in the direction already stated, while the sprocket-chains readily permit of said rolls being separated in the manner above described.

*Adjusting devices.*—The rear sprocket-wheel shafts 39 and 41 are mounted in sliding bearings 83 at each end. Said bearings are received in slots 84 in the side frames and are adjusted to move said shafts, and so to tighten or slacken the sprocket-chains by means of set-screws 85, passing through fixed lugs 86. The particular object, however, of this adjustment is to adapt the machine to different lengths of tobacco-leaf. It is obvious that the travel of the clamping device will depend upon the length of the stem and that after it has moved rearward to bring the stripped stem clear of the stripping-rolls there is no need for further travel, and the stem may be released. Obviously this extent of travel depends upon the length of the sprocket-chains carrying the clamping device and the distance between the front and rear sprocket-wheels. By means of the aforesaid adjustment the rear wheels can be brought to such a distance from the front ones as will best suit the lengths of stem treated, and the chains will of course be suitably shortened by removing links in the ordinary way. In order to maintain the parallelism of the adjacent parts of the upper and lower sprocket-chains and to secure uniform clamping pressure of the clamping-bars upon the stem during the travel of the latter, the following device is provided: On the inner side of each side plate is bolted a flanged channel-plate 87, Figs. 13, 14. The outer faces of the flanges 88 of said plate are shouldered to receive the movable plates 89 90. Said movable plates are secured to said flanges by screw-bolts 91, which pass through vertically-elongated slots in said plates. Passing through the flanges are set-screws 92, which engage with the upper movable plate 89, and set-screws 93, engaging with the lower movable plate 90. The lower edge of plate 89 comes directly above the lower portion of the upper sprocket-chain, and the upper edge of plate 90 comes directly below the upper portion of the lower sprocket-chain. By loosening the screws 91 either plate may by the action of screws 92 or 93 be forced against the sprocket-chain adjacent to it, and in this way the portions of the pair of chains on each side of the machine may be adjusted relatively to one another and also kept in a rectilinear line. The channel-plates 87 are made in sections, as indicated in Fig. 2, so that one or more of them may be removed when the sprocket-wheels are brought nearer together, as above described, in order to shorten the travel of the clamping-bars when relatively short-stemmed leaves are treated.

This machine while adapted to the stripping of tobacco-leaves of all lengths is more especially suited for operation on short leaves of from six to ten inches in length, and especially upon small and limber leaves of the sort commonly known as "Virginia brights" and used in cigarettes. The clamping of the short leaf once and for all without passing it from one holding device to another effects a material saving, since ordinarily about two and one-fourth inches of stem remains untreated by reason of this necessary transference, while the shorter the stem of course the greater the relative loss in unstripped portion.

I claim—

1. In a tobacco-stripping machine, a leaf-clamping device, means for imparting to said clamping device a movement of translation, means for simultaneously cutting the leaf portion from the stem and gearing substantially as set forth whereby the speed of onward movement of the stem is made substantially equal to the speed at which said cutting means removes said leaf portion from the stem.

2. In a tobacco-stripping machine, a leaf-clamping device, means for imparting to said clamping device a rectilinear movement of translation, a pair of rotary coacting rolls having circumferential grooves and transverse cutting edges therein and gearing substantially as set forth whereby the tobacco-leaf entering between said rolls has its leaf portion removed from the stem during said rectilinear movement of said clamping device and at a speed substantially equal to that of said movement.

3. In a tobacco-stripping machine, a pair of coacting leaf-stripping rolls and a pair of coacting drawing-in bars; the said bars moving in a rectilinear path, and means for moving both of said rolls asunder in relatively opposite directions to permit the passage of said bars between them, substantially as described.

4. In a tobacco-stripping machine, a pair of coacting leaf-stripping rolls, means for intermittently moving both of said rolls asunder in relatively opposite directions, and a pair of coacting drawing-in bars moving in a rectilinear path; the aforesaid parts being constructed and arranged so that a leaf on being grasped between said drawing-in bars is thereby carried between said stripping-rolls to be subjected to the action thereof, and the stem transported away from said rolls, substantially as described.

5. In a tobacco-stripping machine, a pair of coacting stripping-rolls and means for intermittently moving both of said rolls asunder in relatively opposite directions, a leaf-clamping device, means for transporting said clamping device between said rolls during their separation and for imparting to said clamping device a further movement of translation during the action of said rolls upon said leaf, and gearing substantially as set forth; whereby the speed of said movement of translation is made substantially equal to the speed at which said stripping-rolls remove the leaf portion from the stem.

6. In a tobacco-stripping machine, a leaf-feeding device, a leaf-clamping device receiving the leaf from said feeding device, a leaf-stripping device, and means for moving said clamping device from said feeding device to said stripping device, substantially as described.

7. In a tobacco-stripping machine, a leaf-clamping device, means for intermittently arresting the movement of the leaf to said clamping device, a leaf-stripping device, and means for moving said clamping device to said stripping device, substantially as described.

8. In a tobacco-stripping machine, a pair of coacting leaf-stripping rolls, means for intermittently separating said rolls, a pair of coacting drawing-in bars moving in a rectilinear path and passing between said rolls when said rolls are separated, and a controlling device governed by said bars for intermittently arresting the movement of the leaves in position to be grasped by said bars, substantially as described.

9. In a tobacco-stripping machine, a pair of coacting leaf-stripping rolls, means for intermittently separating said rolls, a leaf-clamping device, a feeding mechanism constructed to convey leaves to said clamping device and means for carrying said clamping device between said rolls when separated and thereafter away from said rolls, substantially as described.

10. In a tobacco-stripping machine, a pair of coacting stripping-rolls, yielding bearings for said rolls, leaf-clamping bars, means for transporting said clamping-bars between said rolls, and associated with each of said clamping-bars, a cam constructed to force said rolls asunder in opposite directions during the passage of said clamping-bars between them, substantially as described.

11. In a tobacco-stripping machine, a plurality of stripping devices disposed at intervals transversely the machine and means for guiding the leaves in separate columns respectively to each of said stripping devices, substantially as described.

12. In a tobacco-stripping machine, a pair of coacting stripping-rolls, each roll having a plurality of circumferential bands of cutting-teeth, means for guiding the leaves in separate columns respectively to each of said bands, substantially as described.

13. In a tobacco-stripping machine, a device timed and constructed intermittently to arrest the delivery of leaves to a clamping device, a clamping device timed and constructed to grasp said leaves at their advancing ends, a leaf-stripping device and means for conveying said clamping device to said stripping device, substantially as described.

14. In a tobacco-stripping machine, a plurality of stripping devices disposed at intervals transversely the machine, a feed-table having longitudinal channels registering respectively with said stripping devices, and means for conveying the leaves from said channels to said stripping devices, substantially as described.

15. In a tobacco-stripping machine, a plurality of stripping devices disposed at intervals transversely the machine, means for guiding the leaves in separate columns respectively to each of said stripping devices, and means for intermittently arresting the movement of said leaves, substantially as described.

16. In a tobacco-stripping machine, a pair of coacting stripping-rolls, elastic bearings for each of said rolls, endless belts surrounding said rolls respectively and having their contiguous portions parallel and extending in front and in rear of said rolls, means for causing travel of said belts, a pair of coacting drawing-in bars respectively carried by said belts and a cam connected to each of said drawing-in bars and constructed to force asunder said rolls on passing between them, substantially as described.

17. In a tobacco-stripping machine, means for intermittently arresting the delivery of leaves into the machine, a leaf-clamping device controlling said means and receiving said leaves, a stripping device, and means for moving said clamping device to convey the leaves to said stripping device, substantially as described.

18. In a tobacco-stripping machine, a pair of coacting stripping-rolls, endless belts surrounding said rolls respectively, means for causing travel of said belts, a pair of coacting drawing-in bars respectively carried by said belts, and guides for maintaining the contiguous parallel portions of said belts in definite relative position, substantially as described.

In testimony whereof I have signed my name to this specification in the presence of two subscribing witnesses.

JAS. A. HUTCHESON.

Witnesses:
  JNO. C. EASLEY,
  JOHN B. HARVIE.